R. H. MUELLER.
SERVICE BOX.
APPLICATION FILED APR. 30, 1917.
1,311,834.
Patented July 29, 1919.
2 SHEETS—SHEET 2.
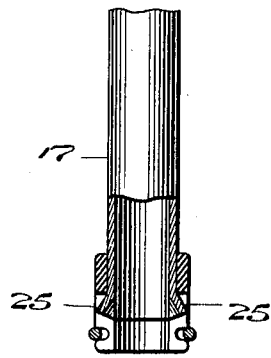
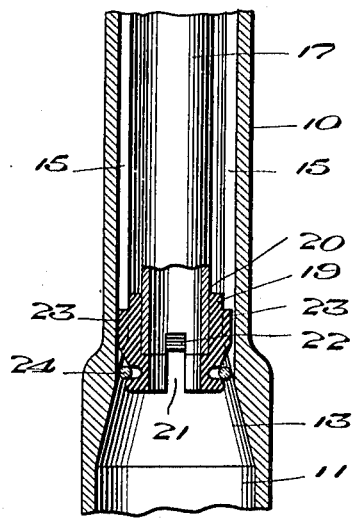
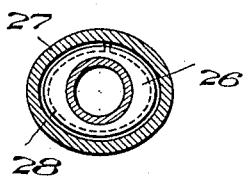
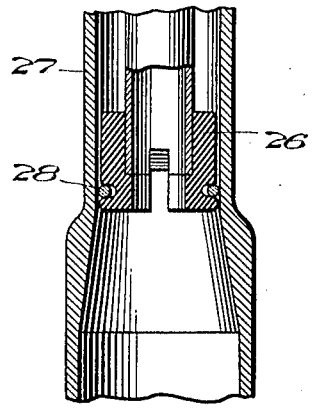
Inventor
Robert H. Mueller
Witnesses
Philip E. Barnes
By
Attorney
THE COLUMBIA PLANOGRAPH CO., WASHINGTON, D. C.

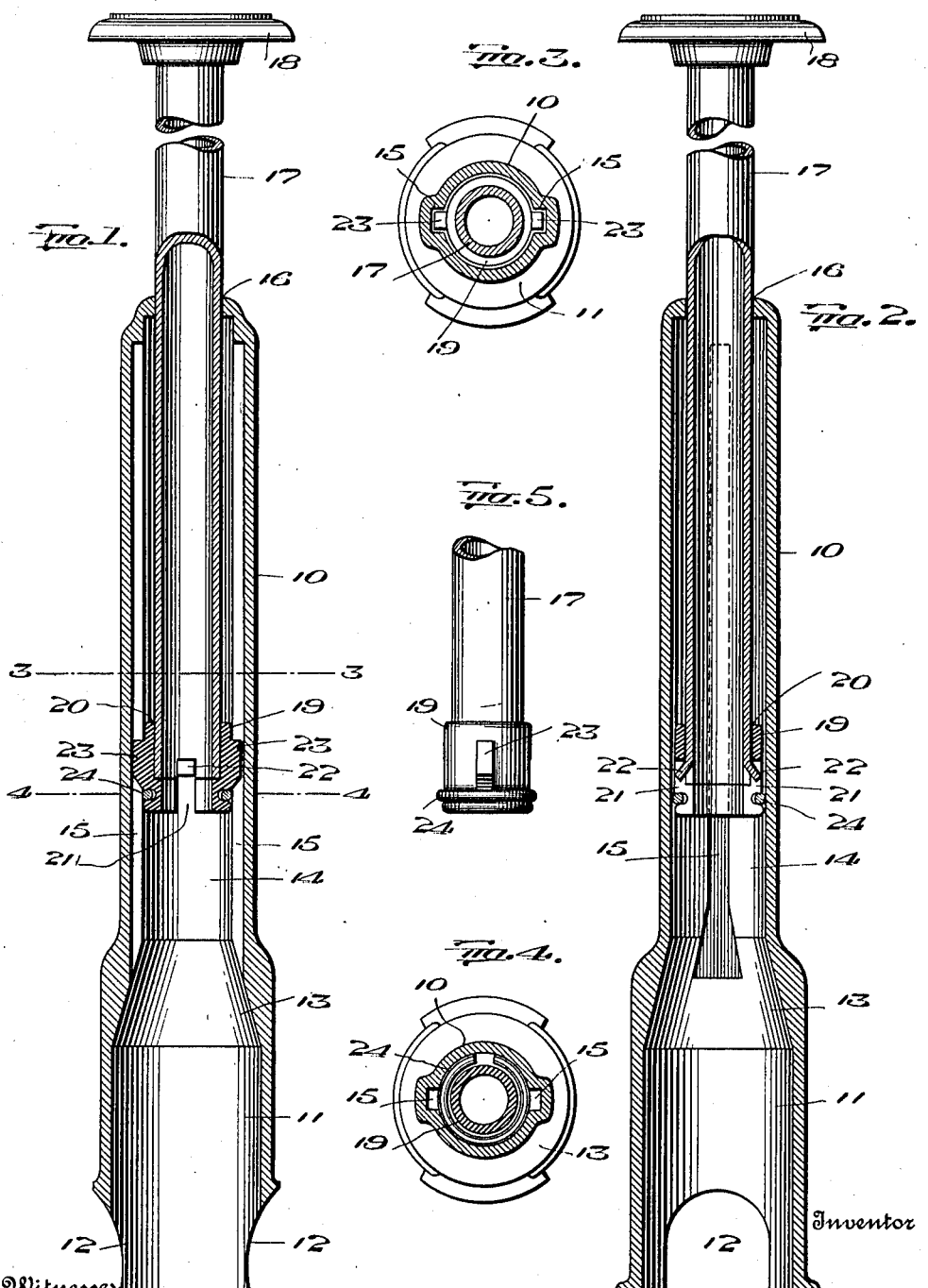

UNITED STATES PATENT OFFICE.

ROBERT H. MUELLER, OF DECATUR, ILLINOIS.

SERVICE-BOX.

1,311,834.  Specification of Letters Patent.  Patented July 29, 1919.

Application filed April 30, 1917. Serial No. 165,534.

*To all whom it may concern:*

Be it known that I, ROBERT H. MUELLER, a citizen of the United States, residing at Decatur, in the county of Macon and State of Illinois, have invented new and useful Improvements in Service-Boxes, of which the following is a specification.

The present invention relates to service boxes, as they are known, which are designed to house stop cocks which are ordinarily used to regulate the flow of fluid, such as water or gas, from service mains to the house connections, these boxes being of such construction that by means of a stop cock key the cocks may be readily manipulated.

The stop cocks with which these service boxes are used are, of course, laid underground at various depths, and in order to do away with the necessity of having a line of boxes of different lengths it has been customary to make them in two telescoping parts, so that they may be adjusted to give the proper length, dependent on the depth to which the pipes and stop cock were laid.

The purpose of the present invention is to provide a telescoping service box which may be readily adjusted through a wide range to adapt it for various depths, and, furthermore, provide a telescoping service box, which, when placed in position over the stop cock and adjusted to the proper length, will be automatically held in its position of adjustment, so that the trench can be filled in, after which it will, of course, be maintained in finally adjusted position.

Broadly considered it is old to provide a telescoping service box in which the parts, after being once adjusted, will be automatically clamped in adjusted position and there held, but the present construction contains certain improvements over that type of automatically clamped adjustable box which make it more desirable and efficient.

In order that the invention may be clear to those skilled in the art I have shown in the accompanying drawings one embodiment of my invention, and in said drawings:

Figure 1 is a view, for the most part in section, of a service box embodying my improvements.

Fig. 2 is a view in vertical section, taken at right angles to the section of Fig. 1.

Fig. 3 is a transverse sectional view on the line 3—3 of Fig. 1.

Fig. 4 is a view in transverse section on the line 4—4 of Fig. 1.

Fig. 5 is a view in elevation of the lower end of the upper telescoping member of the service box.

Fig. 6 is a sectional view of the lower end of the upper telescoping member of the service box, showing a slightly modified construction Fig. 7 is a vertical sectional view of portions of the upper and lower telescoping members to show the manner of assembling.

Fig. 8 is a view in cross section to illustrate a slightly different form of casing.

Fig. 9 is a vertical section of the form of the invention shown in Fig. 8.

Referring to the drawings by numbers, like numbers indicating like parts in the several views, 10 indicates the lower or outer casing member of the service box, this being preferably cast and having an enlarged chamber 11 at its lower end, which lower end may be also split or arched, as at 12, if desired, although it is not of necessity of this arched type. The chamber 11 leads to a chamber 13 having an inclined wall, as shown, the chamber 13 connecting with the tubular bore 14 of the upper part of the member 10. The wall of the chamber 14 has means, such as a groove or grooves 15, herein shown as diametrically arranged for the purpose of locking this lower member of the casing and the upper member, presently to be described, against relative rotation, although permitting free longitudinal movement of the upper and lower members relative to each other. The lower ends of the grooves 15 terminate in the inclined wall of the chamber 13, and they are preferably flared, as shown in Fig. 2, for a purpose which will presently appear. At its upper end the casing 10 is crowned and has a circular aperture 16 therein, which receives the upper telescoping member 17. The upper member 17 is shown in the present instance as tubular, and it has a sliding fit with the lower member 10 through the aperture 16, this fit being such that, while permitting the parts to move freely, it will prevent the entrance of dirt between the member 17 and the walls of the aperture 16. At its upper end the member 17 is provided with any suitable cover or cap 18, which may be removed when it is necessary to manipulate the stop cock by means of the stop key, which stop key may be inserted through the unobstructed interior of the members 17 and 10.

At its lower end the upper member 17 is provided with a head 19, preferably cast as shown, which has a socket 20 to receive the lower end of the upper member 17, this socket being preferably chambered out so that when the member 17 and head are brought together, as shown in Fig. 1, the bores of the head 19 and the member 17 will coincide and give a smooth interior without projections. The head 19 and the member 17 may be connected in any suitable manner, but I have shown a convenient form of connection in Figs. 1 and 2, in which the head 19 is cut diametrically through a portion of its length, as shown at 21, and lugs 22 are struck out from the lower end of the member 17 into the recess formed by the cut 21 in the head 19, so as to lock the parts firmly together, as shown in Fig. 2, this forming a convenient and cheap method of fastening the parts rigidly together.

Exteriorly the head 19 is provided with outstanding lugs 23, which engage the grooves 15 and hold the parts from rotation, although permitting them to have free longitudinal movement relative to each other. The grooves 15, as has been stated, terminate in the inclined wall of the chamber 13, and the flaring lower ends of these grooves 15 form a convenient mouth to direct the lugs 23 to the grooves, so that when the parts are assembled the lugs 23 will readily enter the grooves.

The head 19 is provided also, preferably at its lower end, with a circular groove, in which is mounted a spring ring 24, this ring being preferably of non-corrodible metal, and of a diameter somewhat larger than the diameter of the groove in the head 19. The said spring ring 24 when expanded is of a diameter somewhat in excess of the diameter of the bore of the lower member 10, so that when the parts are assembled and the member 17 is, for example, in the position shown in Fig. 1, the spring ring 24 will engage the wall of the member 10 with sufficient friction to maintain the member 17 in any position of adjustment, the groove in the head 19 being of sufficient depth to permit a considerable play of the spring 24, so that in event of projections or roughness in the bore of the member 10, due to casting operations, the spring may yield sufficiently and eliminate any danger of jamming.

In the disclosure in Fig. 6 the lugs 25 instead of being struck out in the form of tongues, as shown in Figs. 1 and 2, are simply bulged or swaged out without cutting the metal, so as to secure interlocking of the tube and the head.

In assembling the members 10 and 17 the head 19 will be secured to the lower end of the member 17, the spring 24 will be snapped into the groove which it engages, as stated, with a loose fit, but from which it cannot be readily displaced, and the upper end of the member 17 will then be inserted through the chambers 11 and 13 until its upper end protrudes from the orifice 16 at the top of the member 10, after which the cap 18 will be attached in any suitable manner. When it is desired to adjust the parts the member 17 will be drawn up with its lugs 23 in engagement with the grooves 15, and as the head 19 passes up through the coned chamber 13 the spring 23 will be compressed by the inclined wall of the chamber 13 (see Fig. 7) and readily drawn into the tubular bore of the member 10. In this condition the parts are under such friction, by reason of the spring 24, that they will maintain their adjusted position, and the necessity for holding the parts extended to the proper length until the filling in has taken place is done away with.

In Figs. 8 and 9 is illustrated a form of the invention in which the grooves in the lower casing and the lugs on the head may be dispensed with by forming the head 26 of a shape other than circular in cross section, the particular form illustrated being an elliptical form. The lower casing 27 will, of course, correspond in its cross sectional shape to the elliptical form of the head, and the spring 28 shown in dotted lines will be of elliptical shape and lie in a groove in the elliptical head 26. With this construction the parts will be non-rotatable with respect to each other, and the grooving of the lower casing and the formation of lugs on the head may be dispensed with.

The construction is of value in that the assembling of the several elements, and particularly the upper member, head, and friction spring may be readily and quickly accomplished, and, furthermore, the insertion of the member 17 into the member 10 is, by reason of the arrangement of the coned and tubular chambers easily accomplished, and without the necessity of using expanding tools or other devices to hold the spring in position to permit the parts to be brought to telescoped condition.

Such variations from the specific embodiment here shown as are within the range of mechanical skill I deem to be within the scope of my invention, and do not limit myself to the particular construction shown, except in so far as I am limited by the terms of the appended claims.

I claim:

1. In a service box and in combination; a lower hollow member having an inturned flange at its top, an upper hollow member telescoping therein and fitting closely said flange, means on one of said members to prevent relative rotation, and means carried at the lower end of said upper member to frictionally engage the lower member and maintain the members in adjusted position.

2. In a service box and in combination; a lower hollow member having an inturned flange at its top, an upper hollow member telescoping therein and fitting closely said flange, means on one of said members to prevent relative rotation, and a contractile spring ring at the lower end of said upper member to frictionally engage the lower member and maintain the members in adjusted position.

3. In a service box and in combination; a lower hollow member, an upper hollow member telescoping therein, means on one of said members to prevent relative rotation, a contractile spring ring carried by said upper member to frictionally engage the lower member and maintain the members in adjusted position, and means carried by said lower member to gradually contract said spring as the parts are assembled.

4. In a service box and in combination; a lower hollow member, an upper hollow member telescoping therein, means on one of said members to prevent relative rotation, a contractile spring ring carried by said upper member to frictionally engage the lower member and maintain the members in adjusted position, and an inclined wall on said lower member to gradually contract said spring as the parts are assembled.

5. In a service box and in combination, a lower hollow member having an enlarged receiving chamber at its lower end, a chamber having an inwardly flaring inner wall adjacent said first-named chamber, an upper tubular chamber extending from said second chamber, an upper hollow member telescoping in said lower member, and a contractile spring at the lower end of said upper member compressible against the wall of said flaring chamber when the parts are assembled and adapted to frictionally engage the tubular chamber of said lower member and maintain the parts in adjusted position.

6. In a service box and in combination; a lower hollow member having a section of its bore coned, and a groove leading vertically therefrom; an upper member telescoping in said lower member and having groove engaging means thereon, and a contractile ring of larger diameter than the bore of said lower member carried by said upper member and adapted to frictionally maintain the parts in adjusted position, said contractile ring engaging the coned bore and being compressed when the parts are assembled.

7. In a service box and in combination; a lower hollow member having a section of its bore coned, and a groove having a flared lower end leading vertically therefrom; an upper member telescoping in said lower member and having groove engaging means thereon, and a contractile ring of larger diameter than the bore of said lower member carried by said upper member and adapted to frictionally maintain the parts in adjusted position, said contractile ring engaging the coned bore and being compressed when the parts are assembled.

8. In a service box and in combination; a lower hollow member having grooves with flared lower ends in its inner wall, an upper hollow member telescoping in said lower member and having lugs to engage said flared grooves when the parts are assembled to lock the members against relative rotation.

9. A service box member comprising a pipe-like section having a groove in its outer wall at its lower end, and a contractile friction spring of greater diameter than said groove mounted therein.

10. A service box member comprising a pipe-like section, a socketed head having a through bore coupled therewith, said head having a circular groove in its outer wall, and a contractile spring loosely mounted in said groove and of greater diameter than the diameter of said groove.

In testimony whereof I have hereunto set my hand in presence of two subscribing witnesses.

ROBERT H. MUELLER.

Witnesses:
ERWIN J. KLEIMEIER,
JEWEL W. WELLS.